US012663533B2

(12) United States Patent
Kim et al.

(10) Patent No.: US 12,663,533 B2
(45) Date of Patent: Jun. 23, 2026

(54) TARGET DETECTION APPARATUS AND METHOD USING ANGLE ESTIMATION OF MPSK-MIMO FMCW RADAR

(71) Applicant: POSTECH RESEARCH AND BUSINESS DEVELOPMENT FOUNDATION, Pohang-si (KR)

(72) Inventors: Kyungtae Kim, Pohang-si (KR); Dongkook Kang, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 351 days.

(21) Appl. No.: 18/583,057

(22) Filed: Feb. 21, 2024

(65) Prior Publication Data

US 2025/0028038 A1      Jan. 23, 2025

(30) Foreign Application Priority Data

Jul. 21, 2023      (KR) ........................ 10-2023-0095388

(51) Int. Cl.
| | |
|---|---|
| *G01S 13/58* | (2006.01) |
| *G01S 7/02* | (2006.01) |
| *G01S 13/89* | (2006.01) |

(52) U.S. Cl.
CPC ............ *G01S 13/584* (2013.01); *G01S 7/021* (2013.01); *G01S 13/89* (2013.01)

(58) Field of Classification Search
CPC ...... G01S 13/325; G01S 13/343; G01S 13/42; G01S 13/584; G01S 13/89; G01S 7/021
See application file for complete search history.

(56) References Cited

U.S. PATENT DOCUMENTS

| | | | | |
|---|---|---|---|---|
| 5,191,337 | A | * 3/1993 | Brovko | ................... G01S 13/34 |
| | | | | 342/160 |
| 5,987,395 | A | * 11/1999 | Donges | ................... G01S 13/08 |
| | | | | 702/158 |
| 2017/0146646 | A1* | 5/2017 | Nakabayashi | ........ G01S 13/584 |
| 2017/0310758 | A1* | 10/2017 | Davis | .................... G01S 13/931 |
| 2020/0072940 | A1* | 3/2020 | Schrattenecker | ..... G01S 13/343 |

(Continued)

FOREIGN PATENT DOCUMENTS

| | | |
|---|---|---|
| KR | 20160081507 A | 7/2016 |

*Primary Examiner* — Peter M Bythrow
(74) *Attorney, Agent, or Firm* — Morgan, Lewis & Bockius LLP

(57) ABSTRACT

A target detection method according to the present disclosure includes generating a range-velocity map from a radar signal of an MPSK-MIMO FMCW radar, detecting a plurality of target signals including a real target signal and a ghost target signal for a target with respect to a velocity axis, estimating an angle of arrival of the target by applying a Capon beamforming algorithm to a target detection result, configuring a phase sequence by extracting phase values for the plurality of target signals from the range-velocity map and arranging the phase values in descending order of velocity value, and arranging differently a plurality of prediction phase values derived using the angle of arrival according to a preset rule to obtain a plurality of candidate phase sequences, and calculating a correlation coefficient between the phase sequence and the plurality of candidate phase sequences and identifying a real target signal in the range-velocity map.

12 Claims, 9 Drawing Sheets

(56)                  References Cited

U.S. PATENT DOCUMENTS

| | | | | |
|---|---|---|---|---|
| 2020/0103515 A1* | 4/2020 | Kishigami | ............ | G01S 13/343 |
| 2020/0150260 A1* | 5/2020 | Lang | ........................ | G01S 13/42 |
| 2020/0300965 A1* | 9/2020 | Wu | ........................... | G01S 7/42 |
| 2020/0355793 A1* | 11/2020 | Lee | ........................ | G01S 13/345 |
| 2021/0055383 A1* | 2/2021 | Lee | ........................ | G01S 13/325 |
| 2021/0190904 A1* | 6/2021 | Bourdoux | ............ | G01S 7/2813 |
| 2021/0208272 A1* | 7/2021 | Lavian | .................... | H03L 7/091 |
| 2021/0278501 A1* | 9/2021 | Sturm | .................... | G01S 7/356 |
| 2022/0043108 A1* | 2/2022 | Lavian | .................... | G01S 7/032 |
| 2022/0099837 A1* | 3/2022 | Crouch | ................ | G01S 13/931 |
| 2022/0155412 A1* | 5/2022 | Bauduin | ................ | G01S 7/032 |
| 2022/0264322 A1* | 8/2022 | Choi | ................... | H04B 7/0617 |
| 2022/0308160 A1* | 9/2022 | Dent | ........................ | G01S 7/025 |
| 2024/0053467 A1* | 2/2024 | Dvorecki | ............. | G01S 13/931 |
| 2024/0351607 A1* | 10/2024 | Sanson | .............. | B60W 60/001 |

* cited by examiner

FIG. 1A
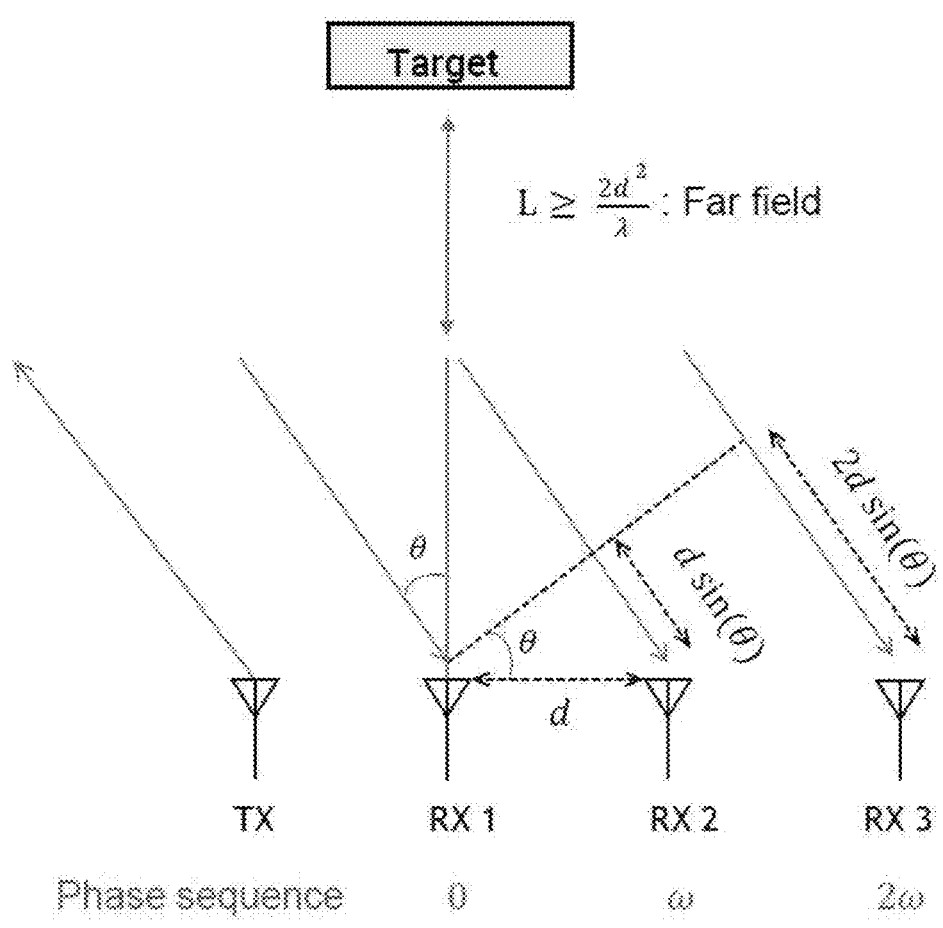
FIG. 1B
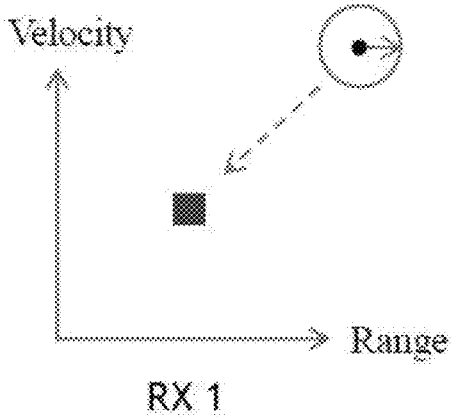
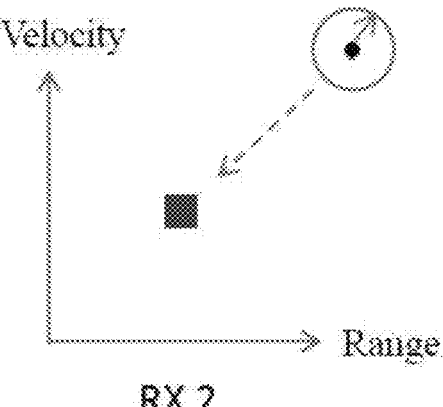

FIG. 2

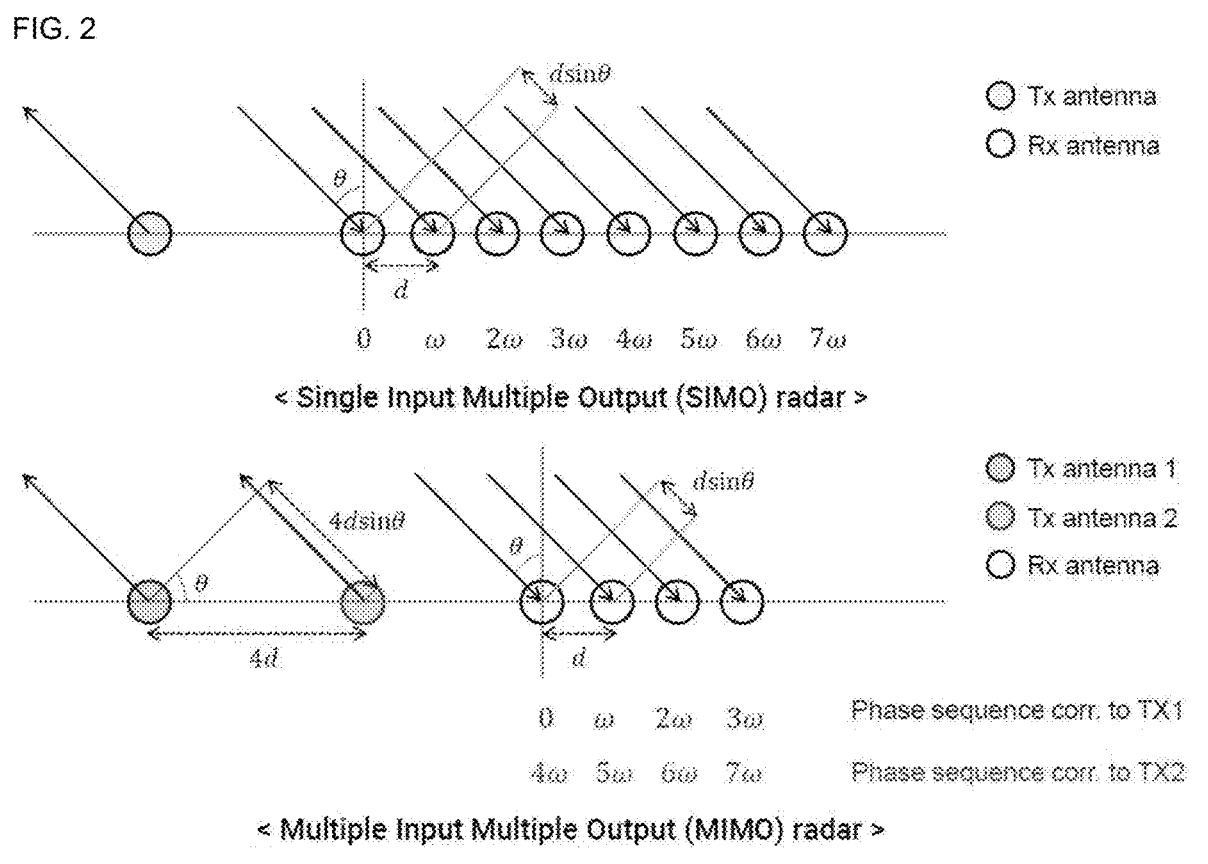

$dsin\theta$

○ Tx antenna
○ Rx antenna $\theta$ $d$

0   $\omega$   $2\omega$   $3\omega$   $4\omega$   $5\omega$   $6\omega$   $7\omega$ < Single Input Multiple Output (SIMO) radar >

$4dsin\theta$          $dsin\theta$

○ Tx antenna 1
○ Tx antenna 2
○ Rx antenna $\theta$          $\theta$ $4d$          $d$ 0   $\omega$   $2\omega$   $3\omega$          Phase sequence corr. to TX1

$4\omega$   $5\omega$   $6\omega$   $7\omega$          Phase sequence corr. to TX2

< Multiple Input Multiple Output (MIMO) radar >

FIG. 3A
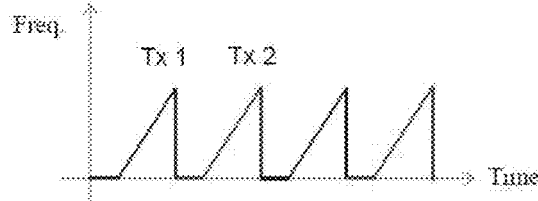
(a) Time Division Multiplexing
FIG. 3B
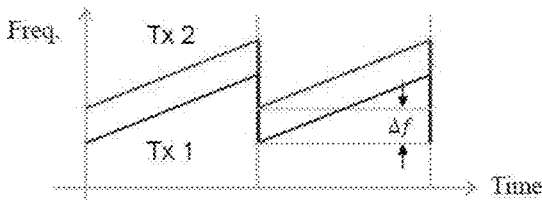
(b) Frequency Division Multiplexing
FIG. 3C
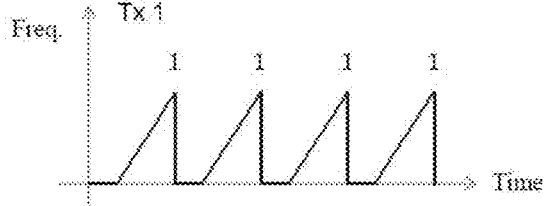 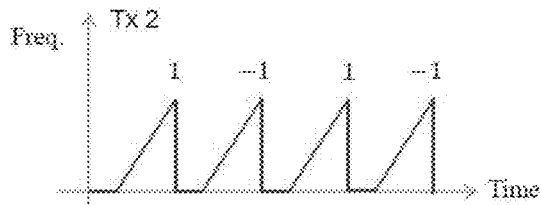
(c) Code Division Multiplexing

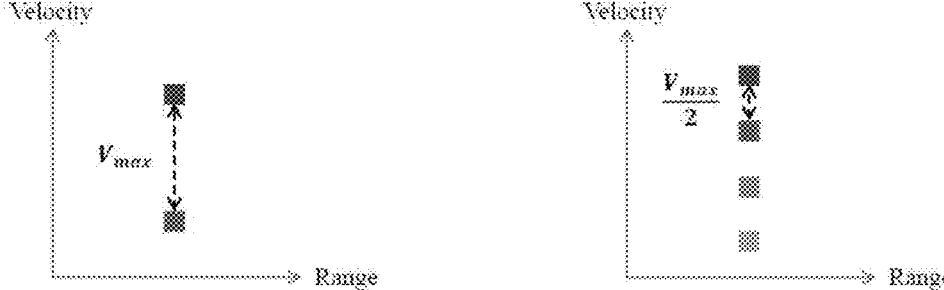
FIG. 4(a) BPSK modulation      FIG. 4(b) QPSK modulation
< Range-Doppler map according to different CDM method >
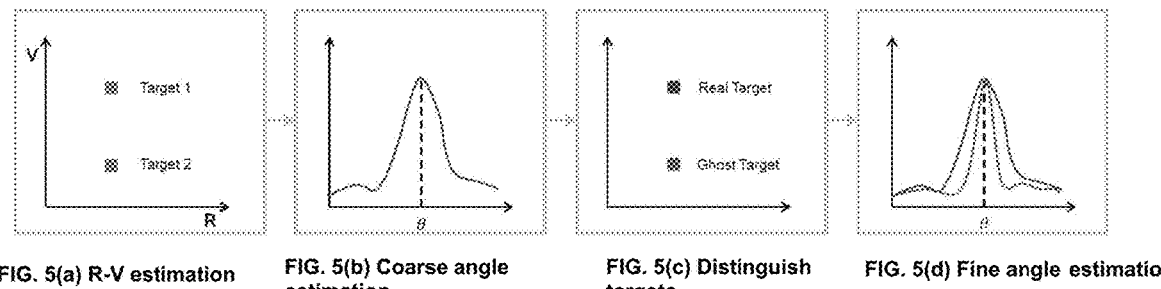
FIG. 5(a) R-V estimation    FIG. 5(b) Coarse angle estimation    FIG. 5(c) Distinguish targets    FIG. 5(d) Fine angle estimation

FIG. 6

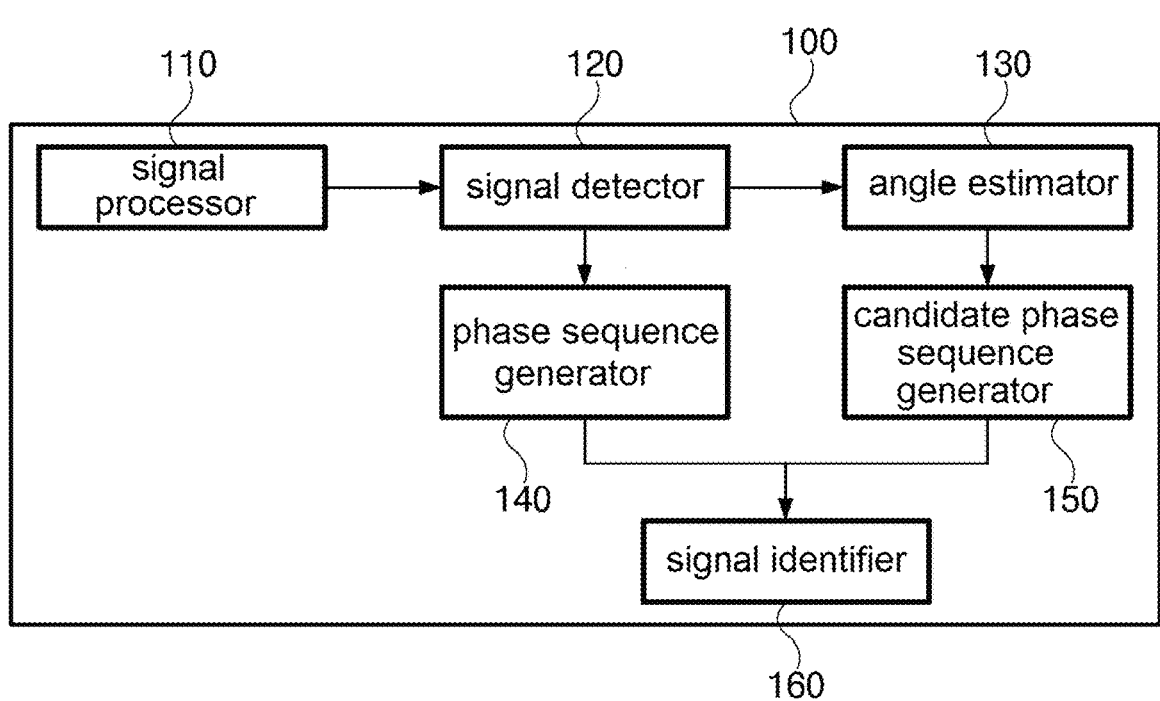

FIG. 7 receive
radar signal

S710 generate distance-velocity
map (estimate R-V map) ~~S720 detect target signals based
on peak detection

S730 estimate angle of arrival
through Capon eamforming

S740 configure phase sequence
through phase values of
peak signals

S750 configure candidate phase
sequence using estimated
angle of arrival

S760 calculate and compare
correlation coefficients

S770 identify real target signal

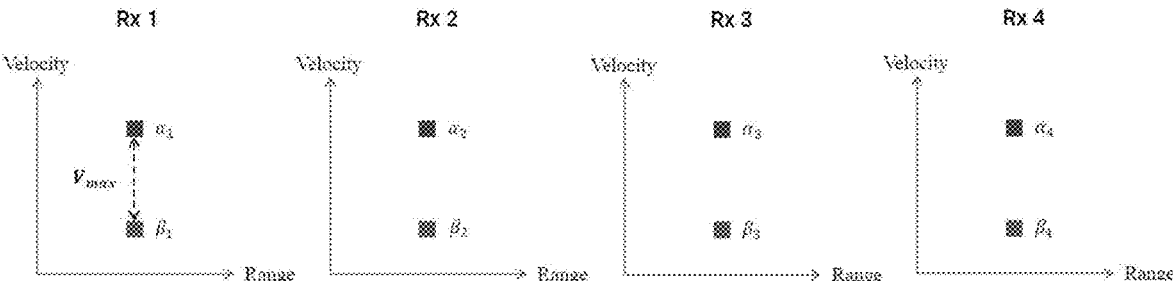

FIG. 9

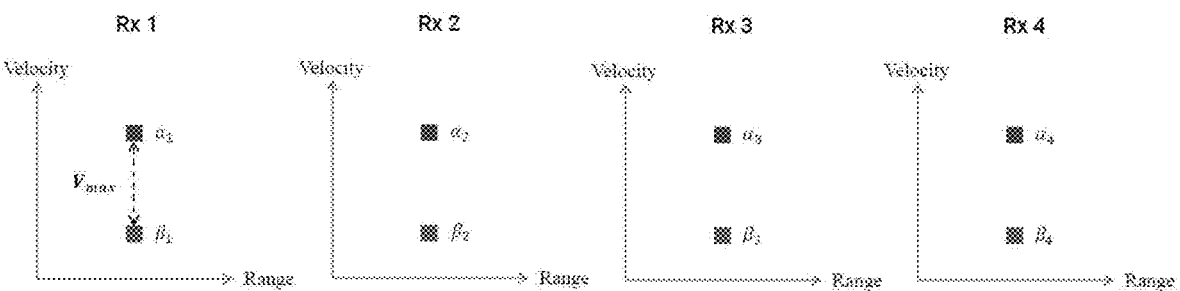

< Range-Velocity Map for Case 1 >

$$[\,\alpha_1\ \alpha_2\ \alpha_3\ \alpha_4\ \beta_1\ \beta_2\ \beta_3\ \beta_4\,] = [\,e^{j0}\ e^{jw}\ e^{j2w}\ e^{j3w}\ e^{j4w}\ e^{j5w}\ e^{j6w}\ e^{j7w}\,]$$

$\alpha_i$ = Real Target.   $\beta_i$ = Ghost Target

FIG. 10

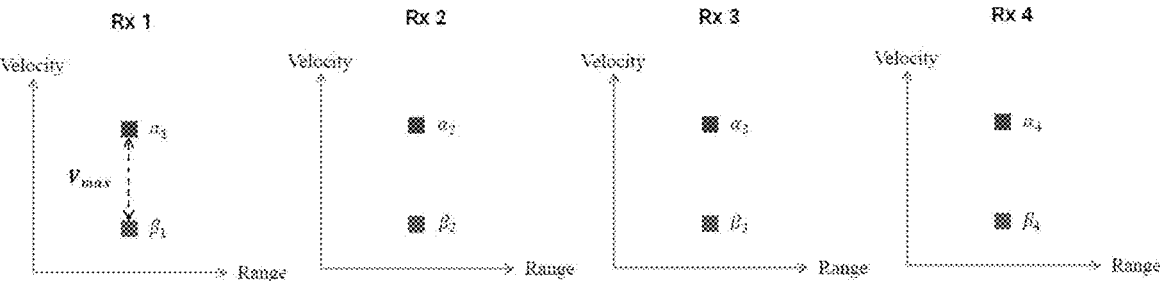

< Range-Velocity Map for Case 2 >

$$[\,\alpha_1\ \alpha_2\ \alpha_3\ \alpha_4\ \beta_1\ \beta_2\ \beta_3\ \beta_4\,] = [\,e^{j4w}\ e^{j5w}\ e^{j6w}\ e^{j7w}\ e^{j0}\ e^{jw}\ e^{j2w}\ e^{j3w}\,]$$

$\alpha_i$ = Ghost Target,   $\beta_i$ = Real Target

1. $[\, e^{j0} \quad e^{jw} \quad e^{j2w} \quad e^{j3w} \quad e^{j4w} \quad e^{j5w} \quad e^{j6w} \quad e^{j7w} \,]$ 2. $[\, e^{j4w} \quad e^{j5w} \quad e^{j6w} \quad e^{j7w} \quad e^{j0} \quad e^{jw} \quad e^{j2w} \quad e^{j3w} \,]$ Compare Sequence $[\, \alpha_1 \quad \alpha_2 \quad \alpha_3 \quad \alpha_4 \quad \beta_1 \quad \beta_2 \quad \beta_3 \quad \beta_4 \,]$ Target 1 : [ 7 m, 10 m/s, 60° ],  Target 2 : [ 12 m, -10 m/s, -40° ]

TARGET DETECTION APPARATUS AND METHOD USING ANGLE ESTIMATION OF MPSK-MIMO FMCW RADAR

CROSS-REFERENCE TO RELATED APPLICATION

This application is based on and claims priority under 35 U.S.C. § 119 to Korean Patent Application No. 10-2023-0095388, filed on Jul. 21, 2023, in the Korean Intellectual Property Office, the disclosure of which is incorporated by reference herein in its entirety.

BACKGROUND

The present disclosure relates to a target detection device and target detection method using angle estimation of an MPSK-MIMO FMCW radar, and more particularly, to a target detection device and target detection method using angle estimation of an MPSK-MIMO FMCW radar which may solve a velocity ambiguity problem by clearly distinguishing between a real target and a ghost target detected on a velocity axis for one target from a radar reception signal by using the MPSK-MIMO FMCW radar.

Recently, radar sensors have been miniaturized, thereby being used for various purposes other than military purposes, such as autonomous driving and indoor monitoring. Also, in order to increase a low angular resolution which was a disadvantage of radar sensors, MIMO radar was adopted to increase angular resolution and solve physical space constraints.

Such MIMO radar may have the same effect as increasing the number of receivers by increasing the number of channels, and signals of each transmitter have to be transmitted separately without ambiguity, and for this purpose, a transmitter code multiplexing technique is widely used.

However, when applying a two-dimensional Fourier transform to estimate a target's range and velocity information by using the technique, multiple ghost targets are detected for one target on a velocity axis, which reduces a range of velocities that may be measured. Therefore, in order to efficiently process signal data received in a radar, it is essential to resolve the velocity ambiguity problem by distinguishing between real targets and ghost targets.

An example of related art includes Korea Patent Publication No. 2016-0081507 (published on Jul. 8, 2016).

SUMMARY

The present disclosure provides a target detection device and method using angle estimation of an MPSK-MIMO FMCW radar, which may solve a velocity ambiguity problem by distinguishing between a real target and a ghost target when detecting a target from a radar reception signal of the MPSK-MIMO FMCW radar.

According to an aspect of the present disclosure, a target detection method, which is performed by a target detection device based on an MPSK-MIMO FMCW radar, includes generating a range-velocity map from a radar signal transmitted from an MPSK-MIMO FMCW radar and then reflected and received, detecting a plurality of target signals including a real target signal and a ghost target signal for a target with respect to a velocity axis from the range-velocity map, estimating an angle of arrival of the target by applying a Capon beamforming algorithm to a target detection result on the range-velocity map, configuring a phase sequence by extracting phase values for the plurality of target signals from the range-velocity map and arranging the phase values in descending order of velocity value, deriving a plurality of prediction phase values by using the angle of arrival and arranging differently the plurality of prediction phase values according to a preset rule to obtain a plurality of candidate phase sequences, and calculating a correlation coefficient between the phase sequence and the plurality of candidate phase sequences and identifying a real target signal among a plurality of target signals of different velocities in the range-velocity map by using the candidate phase sequence representing a highest correlation coefficient.

Also, the detecting of the plurality of target signals may include detecting M target signals with different velocities per target for each velocity axis in N range-velocity maps obtained from M transmission antennas and N reception antennas.

Also, the configuring of the phase sequence may include extracting 2N phase values in response to a total of 2N target signals obtained for the N range-velocity maps in a BPSK method in which M=2, and configuring the phase sequence including a total of 2N phase values by arranging N phase values extracted from a signal with a higher velocity value in order of reception channel among two target signals in each of the N range-velocity maps and then arranging N phase values extracted from other signals with lower velocity values in order of the reception channel.

Also, in the obtaining of the plurality of candidate phase sequences, a total of 2N prediction phase values from $e^{j0\omega}$ to $e^{j(2N-1)\omega}$ may be calculated in response to a total of 2N target signals detected from signals of a total of N reception antennas in a BPSK method in which M=2, and $\omega$ may be a phase difference between signals and may be defined by an equation $$\omega = \frac{2\pi d \sin(\theta)}{\lambda}$$

where d represents an interval between the N reception antennas, θ represents an angle of arrival, and λ represents a radar wavelength.

Also, the obtaining of the plurality of candidate phase sequences may include generating a first candidate phase sequence S1 in which a target signal corresponding to a higher velocity value among two target signals in each of range-velocity maps is assumed to be the real target signal and a second candidate phase sequence S2 in which a target signal corresponding to a lower velocity value is assumed to be the real target signal, when M=2 and N=4, as follows $$S1 = [\, e^{j0} \quad e^{jw} \quad e^{j2w} \quad e^{j3w} \quad e^{j4w} \quad e^{j5w} \quad e^{j6w} \quad e^{j7w} \,], \text{ and}$$

$$S2 = [\, e^{j4w} \quad e^{j5w} \quad e^{j6w} \quad e^{j7w} \quad e^{j0} \quad e^{jw} \quad e^{j2w} \quad e^{j3w} \,].$$

Also, the identifying of the real target signal may include comparing a first correlation coefficient between the phase sequence and the first candidate phase sequence with a second correlation coefficient between the phase sequence and the second candidate phase sequence, and identifying a target signal located at a higher velocity value among the two target signals in each of the range-velocity maps as the real target signal when the first correlation coefficient is greater than the second correlation coefficient, and identifying a target signal located at a lower velocity value as the real target signal when the second correlation coefficient is greater than the first correlation coefficient.

According to another aspect of the present disclosure, a target detection device based on a MPSK-MIMO FMCW radar includes a signal processor configured to generate a range-velocity map from a radar signal transmitted from the MPSK-MIMO FMCW radar and then reflected and received, a signal detector configured to detect a plurality of target signals including a real target signal and a ghost target signal for a target with respect to a velocity axis from the range-velocity map, an angle estimator configured to estimate an angle of arrival of the target by applying a Capon beamforming algorithm to a target detection result on the range-velocity map, a phase sequence generator configuring a phase sequence by extracting phase values for the plurality of target signals from the range-velocity map and configured to arrange the phase values in descending order of velocity value, a candidate phase sequence generator configured to derive a plurality of prediction phase values by using the angle of arrival and arranging differently the plurality of prediction phase values according to a preset rule to obtain a plurality of candidate phase sequences, and signal identifier configured to calculate a correlation coefficient between the phase sequence and the plurality of candidate phase sequences and identify a real target signal among a plurality of target signals of different velocities in the range-velocity map by using the candidate phase sequence representing a highest correlation coefficient.

BRIEF DESCRIPTION OF THE DRAWINGS

Embodiments of the inventive concept will be more clearly understood from the following detailed description taken in conjunction with the accompanying drawings in which:

FIGS. 1A and 1B are diagrams illustrating a structure of a SIMO radar system using a single transmission antenna and a plurality of reception antennas;

FIG. 2 illustrates a phase difference between received signals in a SIMO system and a MIMO system;

FIGS. 3A to 3C are diagrams illustrating a signal multiplexing strategy for a MIMO system;

FIGS. 4(a) to 4(b) illustrate R-V map characteristics of a received signal in an MPSK MIMO radar system using code division multiplexing;

FIGS. 5(a) to 5(d) illustrate summary of a target detection algorithm according to an embodiment of the present disclosure;

FIG. 6 is a diagram illustrating a configuration of a target detection device based on an MPSK-MIMO FMCW radar according to an embodiment of the present disclosure;

FIG. 7 is a diagram illustrating a target detection method according to an embodiment of the present disclosure;

FIG. 8 illustrates an R-V map for a received signal of each reception antenna using a 2×4 MIMO FMCW radar of a BPSK method;

FIGS. 9 and 10 are diagrams illustrating a principle of generating candidate phase sequences for the two cases of FIG. 8;

DETAILED DESCRIPTION OF THE EMBODIMENTS

Figure 11:
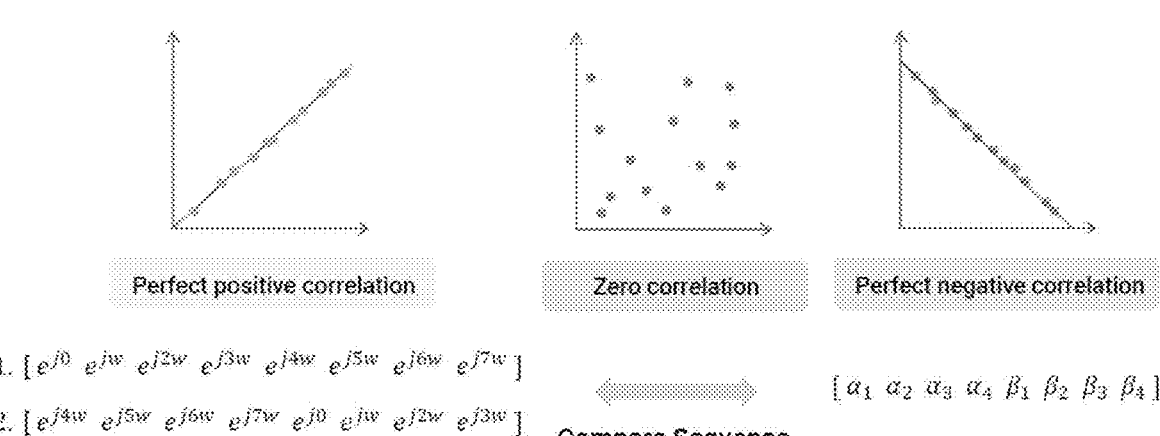
FIG. 11 illustrates a concept of comparing correlation coefficients with phase sequences of two cases.

Then, embodiments of the present disclosure will be described in detail with reference to the accompanying drawings such that those skilled in the art to which the present disclosure belongs may easily practice the embodiments. However, the present disclosure may be implemented in many different forms and is not limited to the embodiments described herein. In addition, in order to clearly describe the present disclosure in the drawings, parts irrelevant to the description are omitted, and similar reference numerals are attached to similar parts throughout the specification.

Throughout the specification, when a portion or a unit is described to be "connected" to another portion or another unit, this includes not only a case of being "directly connected", but also a case of being "electrically connected" with other elements therebetween. In addition, "including" a certain component means that other components may be further included, rather than excluding other components unless otherwise stated.

The present disclosure relates to a target detection method using angle estimation based on an MPSK-MIMO FMCW radar, and proposes a method of analyzing phase characteristics of each target including real and ghost targets occurring on a velocity axis and detecting a real target by using angle estimation when applying a two-dimensional Fourier transform to a radar signal to estimate a target's range and velocity information.

The MPSK-MIMO FMCW radar refers to an FMCW radar device using a multiple-input-multiple-output method and an M phase shift keying (MPSK) method.

Specifically, the MPSK-MIMO FMCW radar transmits a radar signal through a plurality of transmission antennas (for example, a transmission array antenna) and receives the radar signal through a plurality of reception antennas (for example, a reception array antenna). Also, a code division multiplexing (CDM) method is used to separate a transmission signal by inserting an MPSK code by applying phase shifts of different values to each transmission antenna.

When using MIMO, the number of transmission and reception antennas is increased, and accordingly, SNR is increased, and angle estimation resolution is increased. Also, when using an MPSK method, different signal phases are added for each transmission antenna, and accordingly, a receiver may identify from which transmission antenna a signal is received.

When there are two transmission antennas, a BPSK method using M=2 may be used, and when there are four transmission antennas, a QPSK method may be used. In this way, signals of different phases may be transmitted from respective transmission antennas.

The present disclosure may detect each target in a range-velocity domain of a radar reception signal by using an MPSK-MIMO FMCW radar and may clearly identify a real target signal by distinguishing between the real target signal and a ghost target signal among multiple target signals detected at different velocities on a velocity axis for one target.

A target detection device according to an embodiment of the present disclosure may include an MPSK-MIMO FMCW radar device or may operate by being connected to the MPSK-MIMO FMCW radar device.

FIGS. 1A and 1B are diagrams illustrating a structure of a SIMO radar system using a single transmission antenna and a plurality of reception antennas.

In FIG. 1A, d represents a range between reception antennas, λ represents a wavelength of a used radar, and θ represents an angle of arrival of a target signal of a reception antenna. It can be seen that a phase difference (phase sequence) of ω occurs between signals of respective reception antennas in a SIMO radar system. Here, the phase difference may be defined as $$\omega = \frac{2\pi d \sin(\theta)}{\lambda}.$$

Referring to FIG. 1A, target signals are detected one by one from a range-velocity map (R-V map) for signals received at respective reception antennas, and it can be seen that there is a phase difference between respective target signals.

FIG. 2 illustrates a phase difference between received signals in a SIMO system and a MIMO system. An upper picture of FIG. 2 illustrates a 1×8 SIMO radar system including one transmission antenna and eight reception antennas, and a lower picture illustrates a 2×4 MIMO radar system including two transmission antennas and four reception antennas.

First, because the 1×8 SIMO system includes a single transmit antenna, eight received signals corresponding to the number of reception antennas are generated. Phase values of the eight multiplexed received signals are 0, 1ω, 2ω, . . . , 7ω, and it can be seen that there is a phase difference of w between the received signals.

Although 2×4 MIMO system includes four reception antennas, the 2×4 MIMO system also includes two transmission antennas, and accordingly, a total of 8 received signals are generated by a combination thereof. In this case, phase values of signals received to respective reception antennas from the first transmission antenna TX1 are referred to as 0, 1ω, 2ω, and 3ω, and phase values of signals received to respective reception antennas from the second transmission antenna TX2 are referred to as 4ω, 5ω, 6ω, and 7ω. The MIMO structure also has a phase difference of w between eight received signals.

The 2×4 MIMO system obtains the same multiplexing effect as the 1×8 SIMO system while requiring fewer antennas than the 1×8 SIMO system, and thus, there is an advantage in reducing a size of an antenna system.

FIGS. 3A to 3C are diagrams illustrating a signal multiplexing strategy for a MIMO system. FIG. 3 illustrates three strategies for a multiplexing effect of a MIMO system using two transmission antennas as illustrated in a lower part of FIG. 2.

FIG. 3A illustrates a time division multiplexing technique in which respective transmission antennas TX1 and TX2 transmit signals at different times, FIG. 3B illustrates a frequency division multiplexing technique in which respective transmission antennas TX1 and TX2 simultaneously transmit signals of different frequencies, and FIG. 3C illustrates a code division multiplexing technique in which respective transmission antennas TX1 and TX2 simultaneously transmit codes orthogonal to each other.

According to an embodiment of the present disclosure, a target may be detected by using a MIMO FMCW radar using an MPSK method, and for this purpose, M transmission antennas and N transmission antennas are used, and when M=2, the BPSK method may be used, and when M=4, a QPSK method may be used.

FIGS. 4(a) to 4(b) illustrate R-V map characteristics of a received signal in an MPSK MIMO radar system using code division multiplexing. FIG. 4(a) illustrates a case where signals are transmitted with different phases through two transmission antennas by the BPSK method, and in this case, two target signals with a velocity difference equal to $V_{max}$ are detected on a velocity axis for one target from an R-V map of the received signal. Two target signals are detected for one real target, one of which may correspond to a real target signal and the other may correspond to a ghost target signal, and the signals have to be distinguished from each other.

FIG. 4(b) illustrates a case where signals are transmitted by the QPSK method from four transmission antennas, and in this case, four target signals with a velocity difference of $V_{max}/2$ are detected on a velocity axis for one target from the R-V map of the received signal. It can also be seen that multiple target signals are detected for one target, one of which may be a real target signal and the others may be ghost target signals.

An embodiment of the present disclosure proposes a technique for identifying a real target and ghost targets among a plurality of target signals existing on a velocity axis of the R-V map based on phase array data for respective target signals detected on the R-V map and a candidate phase array obtained based on the phase difference w expected by the angle of arrival θ of the received signal.

The embodiment of the present disclosure solves a velocity ambiguity problem by clearly distinguishing between a real target and a ghost target detected on a velocity axis for one target in a radar reception signal using an MPSK-MIMO FMCW radar.

Following embodiments of the present disclosure specifically and representatively describe a real target detection technique by using a MIMO FMCW radar using the BPSK method with M=2.

FIGS. 5(a) to 5(d) illustrate summary of a target detection algorithm according to an embodiment of the present disclosure. FIGS. 5(a) to 5(d) illustrate examples using a BPSK-MIMO FMCW radar.

First, as illustrated in FIG. 5(a), a range-velocity map (R-V map) is generated for a radar reception signal reflected from a target, and a plurality of target signals detected as a peak greater than a threshold are detected from the R-V map. It can be seen that two target signals having different velocity values are detected at the same range for one real target. Next, coarse angle estimation of a target is made by using data of the R-V map as illustrated in FIG. 5(b). In this case, peak signals (target signals) in the R-V map are analyzed to estimate a target's angle of arrival θ based on a Capon beamforming algorithm. In this case, velocity values of respective target signals in the R-V map are distributed differently, but this does not affect estimating an approximate angle of the real target.

Next, as illustrated in FIG. 5(c), a real target signal and a ghost target signal are distinguished by using the angle of arrival θ which is the estimated angle information. In FIG. 5(c), among two target signals initially detected in 5(a), a first target signal Target1 is identified as a real target, and a second target signal Target2 is identified as a ghost target.

Thereafter, fine angle estimation may be made by using a velocity value of the real target signal identified as illustrated in FIG. 5(d), and the angle of arrival θ may be estimated with higher resolution.

FIG. 6 is a diagram illustrating a configuration of a target detection device based on an MPSK-MIMO FMCW radar according to an embodiment of the present disclosure, and FIG. 7 is a diagram illustrating a target detection method according to an embodiment of the present disclosure.

As illustrated in FIG. 6, a target detection device 100 based on an MPSK-MIMO FMCW radar, according to an embodiment of the present disclosure includes a signal processor 110, a signal detector 120, an angle estimator 130, a phase sequence generator 140, a candidate phase sequence generator 150, and a signal identifier 160. Here, operations of respective components 110 to 160 and a data flow between the respective components may be controlled by a controller (not illustrated).

The target detection device 100 may include an MPSK-MIMO FMCW radar device (not illustrated) or may operate by being connected to the MPSK-MIMO FMCW radar device (not illustrated). Also, the signal detection device 100 may also control an operation of the MPSK-MIMO FMCW radar device (not illustrated).

Also, in the embodiment of the present disclosure, the MPSK-MIMO FMCW radar device (not illustrated) may be mounted on a drone, a flying vehicle, or so on, and a target may include at least one of a person, an object, and a movement object. The present disclosure is not limited thereto, and there may be various embodiments of an installation position and a target type of the radar.

First, the signal processor 110 obtains a radar signal transmitted from a radar and then reflected from a target by using the MPSK-MIMO FMCW radar (S710). In addition, the signal processor 110 generates a range-velocity map (R-V map) from the acquired radar signal (S720).

Here, the signal processor 110 may generate the range-velocity map by performing Fourier transform on the data of respective reception antennas (reception channels) of the radar. The range-velocity map includes phase information of the radar signal on a range-velocity axis. The signal processor 110 may transmit a range-velocity map generation result to the signal detector 120.

The signal detector 120 detects a plurality of target signals including a real target signal and a ghost target signal for each target on a velocity axis from the range-velocity map (S730). Accordingly, multiple target signals that overlap each other at the same range and have different velocities may be detected for one target. In this case, many target signals as many as the number of transmission antennas may be detected for one real target.

The signal detector 120 may detect a plurality of target signals, each having a peak value greater than a threshold, by applying a general target detection algorithm to the range-velocity map, and may transmit detection results to the angle estimator 130 and the phase sequence generator 140. Subsequent step S740 and step S750 may be performed simultaneously.

Following embodiment of the present disclosure describe an M×N MPSK-MIMO FMCW radar device. In this case, M and N respectively refer to the number of transmission antennas and the number of reception antennas, and an M-PSK modulation method is applied based on the number of transmission antennas. Here, the number of reception antennas may be different from or equal to the number of transmission antennas.

In the present embodiment of the present disclosure, the signal detector 120 may detect M target signals with different velocities per target on each velocity axis in N range-velocity maps obtained from N reception antennas. In the BPSK method with M=2, a total of 2N (M×N) target signals may be obtained for N range-velocity maps.

Assuming the BPSK method with M=2, as illustrated in FIG. 5(a), when a target detection method is applied to the R-V map, two target signals are detected with different velocity values on one target, and among the two target signals, one target signal corresponds to a real target signal and the other target signal corresponds to a ghost target signal.

FIG. 8 illustrates an R-V map for a received signal of each reception antenna using a 2×4 MIMO FMCW radar of a BPSK method.

FIG. 8 illustrates a case where M=2 and N=4, and in this case, it can be seen from R-V maps of four reception antennas RX1 to RX4 that two target signals are detected in each of the R-V maps. Here, among the two target signals in the R-V map, a phase value of the target signal located above is indicated by a symbol $a_i$, and a phase value of the target signal located below is indicated by a symbol $\beta_i$. Here, i represents an index of a reception antenna, and I=1, 2, 3, and 4.

In an embodiment of the present disclosure, a phase array for the phase values extracted on the target signals detected in the current R-V map is compared with phase arrays (candidate phase arrays) of two cases estimated based on an angle of arrival, and thereby, a real target signal and a ghost target signal among target signals in the R-V map may be distinguished.

To this end, the angle estimator 130 estimates the angle of arrival θ of a target by applying a Capon beamforming algorithm to a target detection result on a range-velocity map received from the signal detector 120 (S740).

target signals of different velocities overlapping to each other in the same range bin are present in the target detection result, but this does not affect the estimation of a target's angle of arrival. Because estimation of the angle of arrival using Capon beamforming corresponds to the known technique, detailed description thereof will be omitted.

Also, the phase sequence generator 140 may extract phase values of a plurality of target signals from a range-velocity map received from the signal detector 120, and arranges the respective phase values in order of the signal with the highest velocity value to determine a phase sequence (S750).

The phase values of the respective target signals may be obtained by analyzing a phase component for each target signal detected from the range-velocity map.

In a case where M=2 and N=4 as illustrated in FIG. 8, the phase sequence generator 140 extracts 8 phase values corresponding to a total of 8 target signals, and arranges the eight extracted phase values according to the principle described above, and thereby, a phase sequence, such as [$\alpha_1$ $\alpha_2$ $\alpha_3$ $\alpha_4$ $\beta_1$ $\beta_2$ $\beta_3$ $\beta_4$], may be generated.

In this way, in the BPSK method in which M=2, the phase sequence generator 140 extracts 2N phase values in response to a total of obtained 2N target signals from N range-velocity maps, and among the two target signals in each range-velocity map, N phase values extracted from signals with high velocity values are arranged in order of reception channel, and then, N phase values extracted from the other signals with low velocity values are arranged in order of reception channel, and a phase sequence consisting of a total of 2N phase values may be configured.

Then, the candidate phase sequence generator 150 derives a plurality of prediction phase values based on the previously estimated angle of arrival, and differently arranges the prediction phase values according to a preset rule to generate a plurality of different candidate phase sequences (S760).

In the BPSK method with M=2, a total of 2N prediction phase values from $e^{j0\omega}$ to $e^{j(2N-1)\omega}$ may be calculated in response to a total of 2N target signals detected from signals of a total of N reception antennas. In this case, $\omega$ is a phase difference between respective signals and may be defined by Equation 1 below.

$$\omega = \frac{2\pi d \sin(\theta)}{\lambda} \qquad \text{Equation 1}$$

Here, d represents an interval between reception antennas, $\theta$ represents an angle of arrival, and $\lambda$ represents a radar wavelength.

In this way, w may be calculated by Equation 1 based on the angle of arrival $\theta$ estimated in step S740, and a total of 2N prediction phase values may be obtained by inserting $e^{j0\omega}$ into $e^{j(2N-1)\omega}$ by using the calculated w value. Here, it is possible to represent as $e^{j0\omega}=e^{j0}$.

When M=2 and N=4, the candidate phase sequence generator 150 may generate a plurality of candidate phase sequences by arranging eight prediction phase values from $e^{j0\omega}$ to $e^{j7\omega}$ according to different rules.

Specifically, when M=2 and N=4, a first candidate phase sequence S1 in which $e^{j0\omega}$ to $e^{j3\omega}$ are arranged at the front is generated as illustrated in Equation 2 by assuming that target signals corresponding to higher velocity values among the two target signals in each range-velocity map are real target signals, and in contrast to this, a second candidate phase sequence S2 in which $e^{j0\omega}$ to $e^{j3\omega}$ are arranged at the rear may be generated as illustrated in Equation 3 by assuming that the target signals corresponding to low velocity values are real target signals.

$$S1 = [e^{j0} \ e^{jw} \ e^{j2w} \ e^{j3w} \ e^{j4w} \ e^{j5w} \ e^{j6w} \ e^{j7w}] \qquad \text{Equation 1}$$

$$S2 = [e^{j4w} \ e^{j5w} \ e^{j6w} \ e^{j7w} \ e^{j0} \ e^{jw} \ e^{j2w} \ e^{j3w}] \qquad \text{Equation 3}$$

In this case, $e^{j0\omega}$ to $e^{j3\omega}$ may refer to prediction phase values related to real target signals, and $e^{j4\omega}$ to $e^{j7\omega}$ may refer to prediction phase values related to ghost target signals.

In an embodiment of the present disclosure, the candidate phase sequence of Equation 1 is defined as Case1, and the candidate phase sequence of Equation 2 is defined as Case 2.

FIGS. 9 and 10 are diagrams illustrating a principle of generating candidate phase sequences for the two cases of FIG. 8.

FIG. 9 is a case assuming $[\alpha_1 \ \alpha_2 \ \alpha_3 \ \alpha_4 \ \beta_1 \ \beta_2 \ \beta_3 \ \beta_4]=[e^{j0} \ e^{jw} \ e^{j2w} \ e^{j3w} \ e^{j4w} \ e^{j5w} \ e^{j6w} \ e^{j7w}]$ and FIG. 10 is a case assuming $$[\alpha_1 \ \alpha_2 \ \alpha_3 \ \alpha_4 \ \beta_1 \ \beta_2 \ \beta_3 \ \beta_4] =$$
$$[e^{j4w} \ e^{j5w} \ e^{j6w} \ e^{j7w} \ e^{j0} \ e^{jw} \ e^{j2w} \ e^{j3w}].$$

10

That is, in FIG. 9, within the four range-velocity maps by respective reception antennas RX1 to RX4, target signals (blue) indicated by ai located at high velocities in the velocity axis are assumed as real target signals, target signals (red) indicated by $\beta_i$ located below are assumed as ghost target signals, $e^{j0\omega}$ to $e^{j3\omega}$ are arranged in the front, and $e^{j4\omega}$ to $e^{j7\omega}$ are arranged in the rear to generate the first candidate phase sequence S1.

In contrast to this, in FIG. 10, target signals (blue) indicated by ai are assumed as ghost target signals, target signals (red) indicated by $\beta_i$ located below are assumed as real target signals, $e^{j4\omega}$ to $e^{j7\omega}$ are arranged in the front, and $e^{j0\omega}$ to $e^{j3\omega}$ are arranged in the rear to generate the second candidate phase sequence S2.

Next, the signal identifier 160 calculates and compares correlation coefficients between a phase sequence extracted on each target signal in step S750 and a plurality of candidate phase sequences obtained based on the angle of arrival in step S760 (S770).

Here, a method of calculating the correlation coefficients may be performed by using the known technique. There are various known methods for calculating a correlation coefficient between two pieces of data including a plurality of elements. The closer the correlation coefficient is to 1, the higher the correlation value, and the closer the correlation coefficient is to −1, the lower the correlation value.

FIG. 11 illustrates a concept of comparing correlation coefficients with phase sequences of two cases.

As illustrated in FIG. 11, the signal identifier 160 calculates a first correlation coefficient between the phase sequence $[\alpha_1 \ \alpha_2 \ \alpha_3 \ \alpha_4 \ \beta_1 \ \beta_2 \ \beta_3 \ \beta_4]$ in step S750 phase sequence the first candidate and $[e^{j0} \ e^{jw} \ e^{j2w} \ e^{j3w} \ e^{j4w} \ e^{j5w} \ e^{j6w} \ e^{j7w}]$ in step S760, and likewise, calculates a second correlation coefficient between the phase sequence $[\alpha_1 \ \alpha_2 \ \alpha_3 \ \alpha_4 \ \beta_1 \ \beta_2 \ \beta_3 \ \beta_4]$ and the second candidate phase sequence $$[e^{j4w} \ e^{j5w} \ e^{j6w} \ e^{j7w} \ e^{j0} \ e^{jw} \ e^{j2w} \ e^{j3w}].$$

Then, the signal identifier 160 identifies a real target signal among a plurality of target signals detected at different velocities in a range-velocity map, based on a result of comparing the correlation coefficients (S780).

The signal identifier 160 compares the first correlation coefficient with the second correlation coefficient to check whether the actually extracted phase sequence has a higher correlation coefficient than any of the two candidate phase sequences. In this case, the signal identifier 160 may identify the real target signal by using the candidate phase sequence illustrating the highest correlation coefficient.

When the first correlation coefficient is greater than the second correlation coefficient, the target signals (blue) indicated by ai located at higher velocity values among the two target signals in the range-velocity map are identified as real target signals, and the target signals (red) indicated by $\beta_i$ located at lower velocity values are identified as ghost target signals.

In contrast to this, when the second correlation coefficient is greater than the first correlation coefficient, the target signals (red) indicated by $\beta_i$ located at the lower velocity values among the plurality of target signals are identified as real target signals, and the target signals (blue) indicated by ai located at the higher velocity values are identified as ghost target signals.

The method of the present disclosure may be summarized as follows: Radar signals are received, and target signals are detected from a range-velocity map generated through two-dimensional Fourier transform in each reception channel. Then, an angle of arrival of a target is extracted by using a Capon beamforming algorithm. In this case, the extracted angle of arrival is used to construct a phase sequence of two cases expected in order of a real target and a ghost target. Then, a phase sequence is configured based on the order of targets on a velocity axis in a range-velocity map generated through two-dimensional Fourier transform in each reception channel of a radar. Finally, a real target is detected by comparing correlation coefficients between the phase sequences of the two cases configured by using an angle of arrival and a phase sequence configured through the two-dimensional Fourier transform.

The target detection method according to the embodiment of the present disclosure, may be individually performed on targets at different positions detected in different range bins.

The following describes a simulation result of the target detection method according to the embodiment of the present disclosure.

Figure 12:
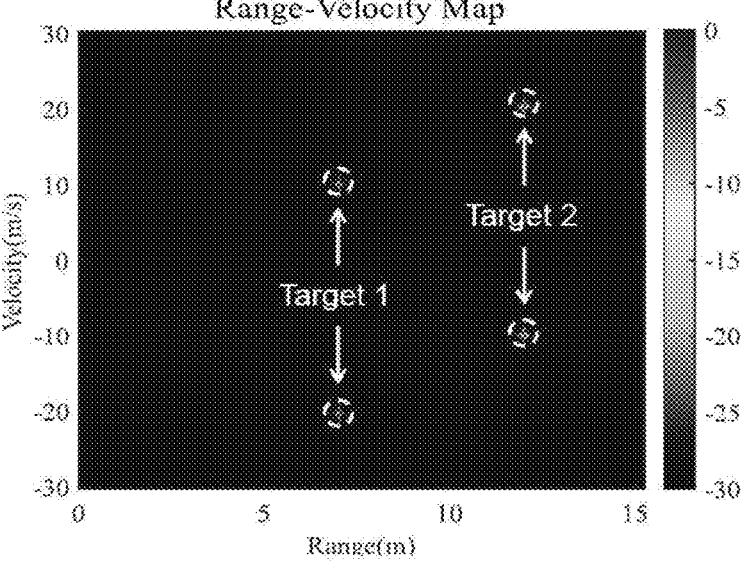
FIG. 12 is a diagram illustrating an R-V map of a radar reception signal using a BPSK-MIMO FMCW radar.

FIG. 12 is a diagram illustrating an R-V map of a radar reception signal using a BPSK-MIMO FMCW radar. It is assumed that there are two targets Target1 and Target2 in an experimental environment and the target Target1 is at a range of 7 meter and an angle of 60° from a radar and the target Target2 is at a range of 12 meter and an angle of –40° from the radar. In this case, it can be seen that two target signals are detected at different velocities in an R-V domain for the real targets target1 and target2.

Figure 13:
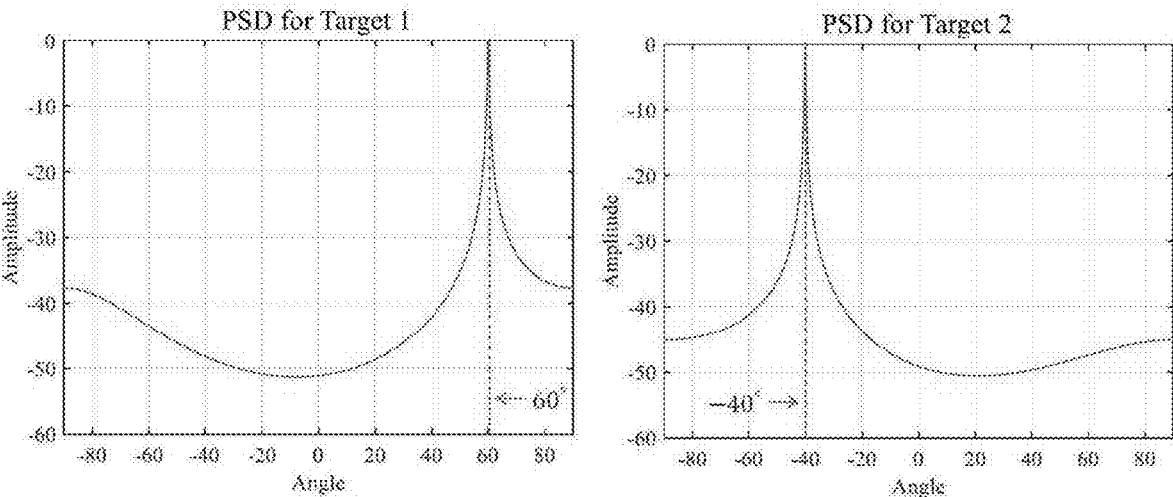
FIG. 13 is a diagram illustrating an angle-of-arrival estimation result for each target detected in the R-V map as illustrated in FIG. 12.

FIG. 13 is a diagram illustrating an angle-of-arrival estimation result for each target detected in the R-V map as illustrated in FIG. 12. The target Target1 is estimated to have an angle of 60°, and the target Target2 is estimated to have an angle of –40° by using the Capon beamforming algorithm.

Figure 14:
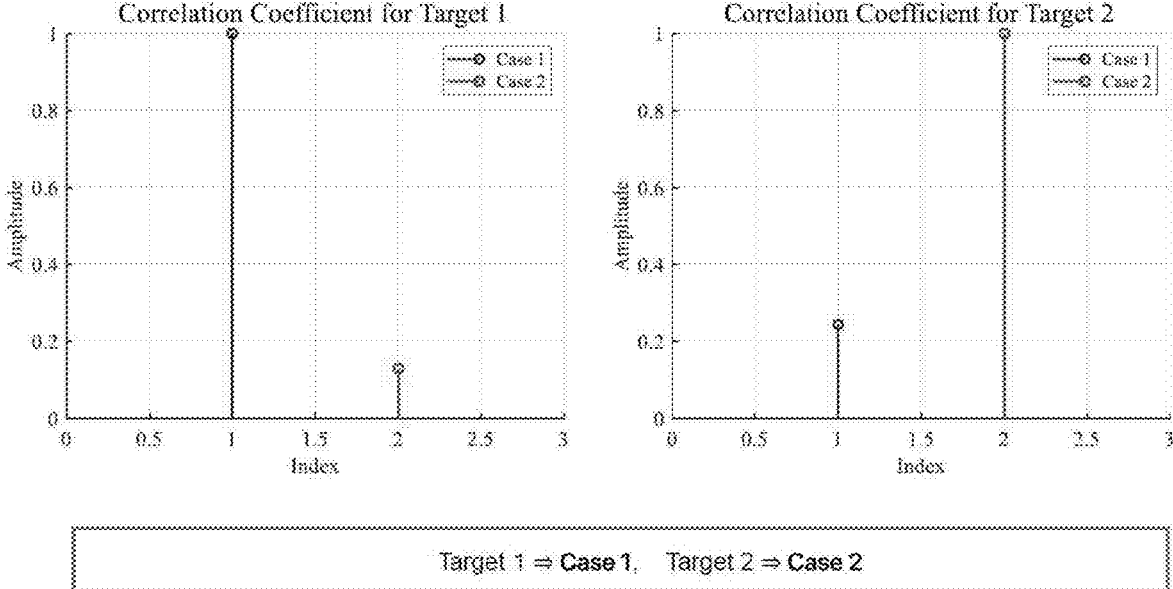
FIG. 14 is a diagram illustrating results of comparing correlation coefficients for phase sequences of each target.

FIG. 14 is a diagram illustrating results of comparing correlation coefficients for phase sequences of each target. A phase sequence for the target Target1 extracted from a radar signal has a higher correlation coefficient with a first candidate phase sequence Case1, and a phase sequence for the target Target2 extracted from the radar signal has a higher correlation coefficient with a second candidate phase sequence Case2.

Figure 15:
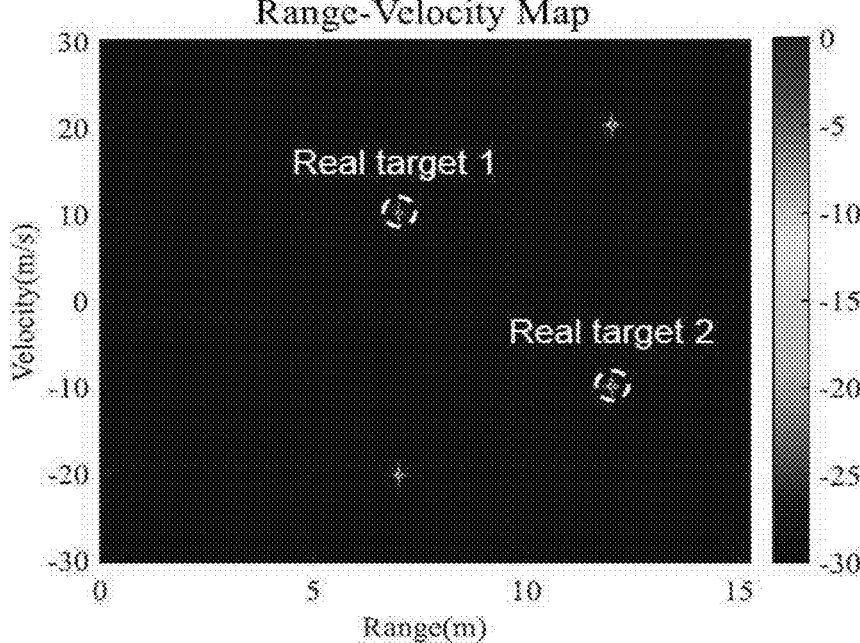
FIG. 15 is a diagram illustrating a result of identifying a real target signal in the R-V map of FIG. 12, according to an embodiment of the present disclosure.

FIG. 15 is a diagram illustrating a result of identifying a real target signal in the R-V map of FIG. 12, according to an embodiment of the present disclosure. Based on the result of FIG. 14, it can be seen that in relation to the target Target1, an upper target signal among the two target signals present at 7 meter is a real target signal, and in relation to the target Target2, a lower target signal among the two target signals present at 10 meter is a real target signal.

Figure 16:
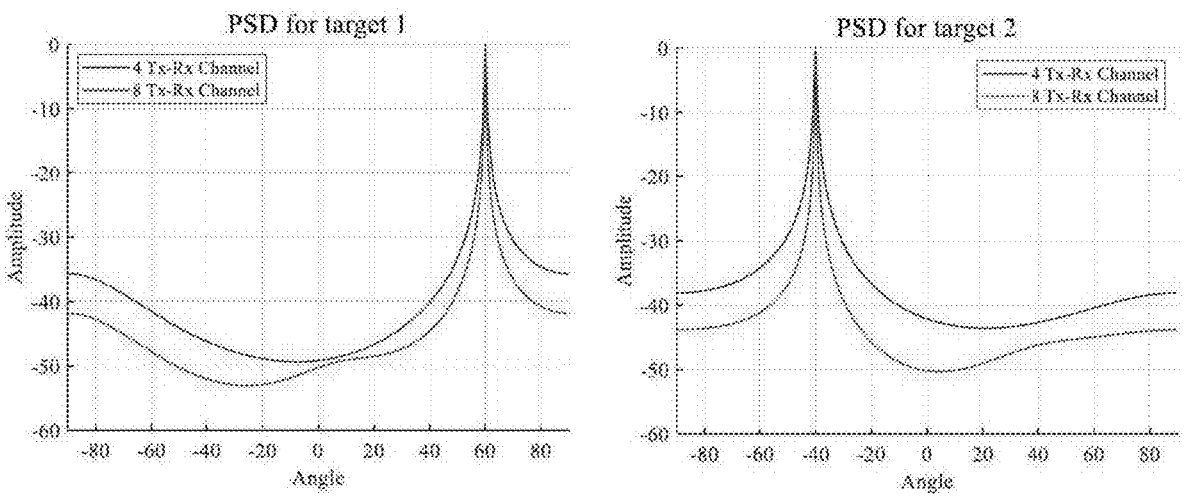
FIG. 16 is a diagram illustrating results of re-estimating an angle at high resolution by using a real target signal for each target detected in FIG. 15.

FIG. 16 is a diagram illustrating results of re-estimating an angle at high resolution by using a real target signal for each target detected in FIG. 15. As illustrated in FIG. 16, by accurately detecting a real target signal and using the detected signal, an angle of a target may be estimated with higher precision. In this way, according to a real target detection method of an MPSK-MIMO FMCW radar of the present disclosure, a velocity range of a target that may be measured may be expanded by accurately distinguishing between a real target and a ghost target, and angular resolution may be further increased by a subsequent angle estimation method.

When a real target is correctly detected from a radar signal by the method of the present disclosure, it is possible to increase a signal to noise ratio (SNR) for a target having a low radar cross section (RCS) compared to other multiplexing methods and to accurately estimate an angle of a moving target.

According to the present disclosure, in a process of detecting a target by using an MPSK-MIMO FMCW radar, a real target and a ghost target may be accurately identified, and accordingly, not only a velocity range of a target that may be measured may be increased, but also an angular resolution may be further increased by a subsequent angle estimation method.

The present disclosure is described with reference to the embodiments illustrated in the drawings, but the embodiments are merely illustrative, and those skilled in the art to which the present disclosure belongs will understand that various modifications and equivalent other embodiments may be derived therefrom. Therefore, the true scope of technical protection of the present disclosure should be determined by the technical idea of the attached claims.

What is claimed is:

1. A target detection method performed by a target detection device based on an MPSK-MIMO FMCW radar, the target detection method comprising:
   generating a range-velocity map from a radar signal transmitted from the MPSK-MIMO FMCW radar and then reflected and received;
   detecting a plurality of target signals including a real target signal and a ghost target signal for a target with respect to a velocity axis from the range-velocity map;
   estimating an angle of arrival of the target by applying a Capon beamforming algorithm to a target detection result on the range-velocity map;
   configuring a phase sequence by extracting phase values for the plurality of target signals from the range-velocity map and arranging the phase values in descending order of velocity value;
   deriving a plurality of prediction phase values by using the angle of arrival and arranging differently the plurality of prediction phase values according to a preset rule to obtain a plurality of candidate phase sequences; and
   calculating a correlation coefficient between the phase sequence and the plurality of candidate phase sequences and identifying a real target signal among a plurality of target signals of different velocities in the range-velocity map by using the candidate phase sequence representing a highest correlation coefficient.

2. The target detection method of claim 1, wherein the detecting of the plurality of target signals includes detecting M target signals with different velocities per target for each velocity axis in N range-velocity maps obtained from M transmission antennas and N reception antennas.

3. The target detection method of claim 2, wherein the configuring of the phase sequence includes:
   extracting 2N phase values in response to a total of 2N target signals obtained for the N range-velocity maps in a BPSK method in which M=2; and
   configuring the phase sequence including a total of 2N phase values by arranging N phase values extracted from a signal with a higher velocity value in order of reception channel among two target signals in each of the N range-velocity maps and then arranging N phase values extracted from other signals with lower velocity values in order of the reception channel.

4. The target detection method of claim 2, wherein, in the obtaining of the plurality of candidate phase sequences, a total of 2N prediction phase values from $e^{j0\omega}$ to $e^{i(2N-1)\omega}$ are calculated in response to a total of 2N target signals detected from signals of a total of N reception antennas in a BPSK method in which M=2, and ω is a phase difference between signals and is defined by an equation $$\omega = \frac{2\pi d\sin(\theta)}{\lambda}$$

where d represents an interval between the N reception antennas, θ represents an angle of arrival, and λ represents a radar wavelength.

5. The target detection method of claim 4, wherein the obtaining of the plurality of candidate phase sequences includes generating a first candidate phase sequence S1 in which a target signal corresponding to a higher velocity value among two target signals in each of range-velocity maps is assumed to be the real target signal and a second candidate phase sequence S2 in which a target signal corresponding to a lower velocity value is assumed to be the real target signal, when M=2 and N=4, as follows $$S1 = [\, e^{j0} \quad e^{jw} \quad e^{j2w} \quad e^{j3w} \quad e^{j4w} \quad e^{j5w} \quad e^{j6w} \quad e^{j7w} \,],$$

and $$S2 = [\, e^{j4w} \quad e^{j5w} \quad e^{j6w} \quad e^{j7w} \quad e^{j0} \quad e^{jw} \quad e^{j2w} \quad e^{j3w} \,].$$

6. The target detection method of claim 5, wherein the identifying of the real target signal includes:

comparing a first correlation coefficient between the phase sequence and the first candidate phase sequence with a second correlation coefficient between the phase sequence and the second candidate phase sequence; and identifying a target signal located at a higher velocity value among the two target signals in each of the range-velocity maps as the real target signal when the first correlation coefficient is greater than the second correlation coefficient, and identifying a target signal located at a lower velocity value as the real target signal when the second correlation coefficient is greater than the first correlation coefficient.

7. A target detection device based on a MPSK-MIMO FMCW radar, the target detection device comprising:

a signal processor configured to generate a range-velocity map from a radar signal transmitted from the MPSK-MIMO FMCW radar and then reflected and received;

a signal detector configured to detect a plurality of target signals including a real target signal and a ghost target signal for a target with respect to a velocity axis from the range-velocity map;

an angle estimator configured to estimate an angle of arrival of the target by applying a Capon beamforming algorithm to a target detection result on the range-velocity map;

a phase sequence generator configuring a phase sequence by extracting phase values for the plurality of target signals from the range-velocity map and configured to arrange the phase values in descending order of velocity value;

a candidate phase sequence generator configured to derive a plurality of prediction phase values by using the angle of arrival and arranging differently the plurality of prediction phase values according to a preset rule to obtain a plurality of candidate phase sequences; and a signal identifier configured to calculate a correlation coefficient between the phase sequence and the plurality of candidate phase sequences and identify a real target signal among a plurality of target signals of different velocities in the range-velocity map by using the candidate phase sequence representing a highest correlation coefficient.

8. The target detection device of claim 7, wherein the signal detector detects M target signals with different velocities per target for each velocity axis in N range-velocity maps obtained from M transmission antennas and N reception antennas.

9. The target detection device of claim 8, wherein the phase sequence generator extracts 2N phase values in response to a total of 2N target signals obtained for the N range-velocity maps in a BPSK method in which M=2, and configures the phase sequence including a total of 2N phase values by arranging N phase values extracted from a signal with a higher velocity value in order of reception channel among two target signals in each of the N range-velocity maps and then arranging N phase values extracted from other signals with lower velocity values in order of the reception channel.

10. The target detection device of claim 8, wherein the candidate phase sequence generator calculates a total of 2N prediction phase values from $e^{j0\omega}$ to $e^{i(2N-1)\omega}$ in response to a total of 2N target signals detected from signals of a total of N reception antennas in a BPSK method in which M=2, and ω is a phase difference between signals and is defined by an equation $$\omega = \frac{2\pi d\sin(\theta)}{\lambda}$$

where d represents an interval between the N reception antennas, θ represents an angle of arrival, and λ represents a radar wavelength.

11. The target detection device of claim 10, wherein

The candidate phase sequence generator generates a first candidate phase sequence S1 in which $e^{i0\omega}$ to $e^{i3\omega}$ are arranged in a front portion by assuming a target signal corresponding to a higher velocity value among two target signals in each of range-velocity maps as the real target signal and a second candidate phase sequence S2 in which $e^{i4\omega}$ to $e^{i7\omega}$ are arranged in a front portion by assuming a target signal corresponding to a lower velocity value as the real target signal, when M=2 and N=4, as follows:

$$S1 = [\, e^{j0} \quad e^{jw} \quad e^{j2w} \quad e^{j3w} \quad e^{j4w} \quad e^{j5w} \quad e^{j6w} \quad e^{j7w} \,],$$

and $$S2 = [\, e^{j4w} \quad e^{j5w} \quad e^{j6w} \quad e^{j7w} \quad e^{j0} \quad e^{jw} \quad e^{j2w} \quad e^{j3w} \,].$$

12. The target detection device of claim 11, wherein the signal identifier compares a first correlation coefficient between the phase sequence and the first candidate phase sequence with a second correlation coefficient between the phase sequence and the second candidate phase sequence, and identifies a target signal located at a higher velocity value among the two target signals in each of the range-velocity maps as the real target signal when the first correlation coefficient is greater than the second correlation coefficient, and identifies a target signal located at a lower velocity value as the real target signal when the second correlation coefficient is greater than the first correlation coefficient.

* * * * *